United States Patent [19]
Panwar et al.

[11] Patent Number: 6,006,326
[45] Date of Patent: Dec. 21, 1999

[54] APPARATUS FOR RESTRAINING OVER-EAGER LOAD BOOSTING IN AN OUT-OF-ORDER MACHINE USING A MEMORY DISAMBIGUATION BUFFER FOR DETERMINING DEPENDENCIES

[75] Inventors: Ramesh Panwar, Santa Clara; Ricky C. Hetherington, Pleasanton, both of Calif.

[73] Assignee: Sun Microsystems, Inc., Palo Alto, Calif.

[21] Appl. No.: 08/882,525

[22] Filed: Jun. 25, 1997

[51] Int. Cl.⁶ .................................................. G06F 13/00
[52] U.S. Cl. ..................... 712/217; 711/167; 712/216; 712/217; 712/23
[58] Field of Search ..................................... 395/386, 388, 395/389, 800.23, 394, 391, 382, 580, 393, 585, 392, 582, 390; 712/217, 216, 23; 711/167

[56] References Cited

U.S. PATENT DOCUMENTS

| | | | |
|---|---|---|---|
| 5,134,561 | 7/1992 | Liptay | 711/164 |
| 5,471,598 | 11/1995 | Quattromani et al. | 711/122 |
| 5,487,156 | 1/1996 | Popescu et al. | 395/393 |
| 5,560,032 | 9/1996 | Nguyen et al. | 395/800.23 |
| 5,561,776 | 10/1996 | Popescu et al. | 395/586 |
| 5,586,278 | 12/1996 | Papworth et al. | 395/582 |
| 5,615,350 | 3/1997 | Hesson et al. | 395/394 |
| 5,619,662 | 4/1997 | Steely et al. | 395/392 |
| 5,625,789 | 4/1997 | Hesson et al. | 395/393 |
| 5,625,837 | 4/1997 | Popescu et al. | 395/800.23 |
| 5,694,577 | 12/1997 | Kiyohara et al. | 395/494 |
| 5,724,536 | 3/1998 | Abramson et al. | 395/392 |
| 5,754,812 | 5/1998 | Favor et al. | 395/392 |
| 5,764,942 | 6/1998 | Kahle et al. | 395/390 |
| 5,860,018 | 1/1999 | Panwar | 712/23 |
| 5,890,008 | 3/1999 | Panwar et al. | 712/15 |

OTHER PUBLICATIONS

Sun Microsystems, Inc., "UltraSPARC–II High Performance 64–bit RISC Processor Application Note," Jul. 1996.
Sun Microsystems Computer Corporation, "The SuperSPARC Microprocessor, Technical White Paper," May 1992.
Intel, "Introduction to the Intel Architecture," 1997.
Motorola, Inc., "PowerPC 620 RISC Microprocessor Technical Summary," Jul. 1996.
Cyrix, "6x86MX Processor," May 19, 1997.
Sun Microelectronics, "The UltraSPARC Processor—Technology White Paper," Aug. 27, 1997.
Steven Wallace and Nader Bagherzadeh, Dept. of Electrical and Computer Engineering, University of California, "Multiple Branch and Block Prediction," Feb. 1997.

*Primary Examiner*—Meng-Ai T. An
*Assistant Examiner*—John Ciccozzi
*Attorney, Agent, or Firm*—William J. Kubida; Robert H. Kelly; Holland & Hart LLP

[57] ABSTRACT

A system for restraining over-eager boosting of load instructions past store instructions in an out-of-order processor. The system comprises a memory disambiguation buffer for storing load and store instruction addresses and associated data and an instruction scheduling window in operative association with the memory disambiguation buffer. The instruction scheduling window and the memory disambiguation buffer determine load/store dependencies and effectuate replay of the store and load instructions wherein a dependent load instruction has been executed prior to a store instruction. An instruction cache is provided in operative association with the memory disambiguation buffer, together to associate the dependent load instructions with a store instruction such that the store instruction is subsequently executed prior to the dependent load instructions.

20 Claims, 10 Drawing Sheets

APPARATUS FOR RESTRAINING OVER-EAGER LOAD BOOSTING IN AN OUT-OF-ORDER MACHINE USING A MEMORY DISAMBIGUATION BUFFER FOR DETERMINING DEPENDENCIES

CROSS-REFERENCES TO RELATED APPLICATIONS

The subject matter of the present application is related to that of co-pending U.S. patent application Ser. No. 08/881,958 for AN APPARATUS FOR HANDLING ALIASED FLOATING-POINT REGISTERS IN AN OUT-OF-ORDER PROCESSOR filed concurrently herewith by Ramesh Panwar; Ser. No. 08/881,729 for APPARATUS FOR PRECISE ARCHITECTURAL UPDATE IN AN OUT-OF-ORDER PROCESSOR filed concurrently herewith by Ramesh Panwar and Arjun Prabhu; Ser. No. 08/881,726 for AN APPARATUS FOR NON-INTRUSIVE CACHE FILLS AND HANDLING OF LOAD MISSES filed concurrently herewith by Ramesh Panwar and Ricky C. Hetherington; Ser. No. 08/881,908 for AN APPARATUS FOR HANDLING COMPLEX INSTRUCTIONS IN AN OUT-OF-ORDER PROCESSOR filed concurrently herewith by Ramesh Panwar and Dani Y. Dakhil; Ser. No. 08/882,173 U.S. Pat. No. 5,848,853, for AN APPARATUS FOR ENFORCING TRUE DEPENDENCIES IN AN OUT-OF-ORDER PROCESSOR filed concurrently herewith by Ramesh Panwar and Dani Y. Dakhil; Ser. No. 08/881,145 for APPARATUS FOR DYNAMICALLY RECONFIGURING A PROCESSOR filed concurrently herewith by Ramesh Panwar and Ricky C. Hetherington; Ser. No. 08/881,732 for APPARATUS FOR ENSURING FAIRNESS OF SHARED EXECUTION RESOURCES AMONGST MULTIPLE PROCESSES EXECUTING ON A SINGLE PROCESSOR filed concurrently herewith by Ramesh Panwar and Joseph I. Chamdani; Ser. No. 08/882,175 for SYSTEM FOR EFFICIENT IMPLEMENTATION OF MULTI-PORTED LOGIC FIFO STRUCTURES IN A PROCESSOR filed concurrently herewith by Ramesh Panwar; Ser. No. 08/882,311 for AN APPARATUS FOR MAINTAINING PROGRAM CORRECTNESS WHILE ALLOWING LOADS TO BE BOOSTED PAST STORES IN AN OUT-OF-ORDER MACHINE filed concurrently herewith by Ramesh Panwar, P. K. Chidambaran and Ricky C. Hetherington; Ser. No. 08/881,731 for APPARATUS FOR TRACKING PIPELINE RESOURCES IN A SUPERSCALAR PROCESSOR filed concurrently herewith by Ramesh Panwar; Ser. No. 08/882,220 for AN APPARATUS FOR HANDLING REGISTER WINDOWS IN AN OUT-OF-ORDER PROCESSOR filed concurrently herewith by Ramesh Panwar and Dani Y. Dakhil; Ser. No. 08/881,847 for AN APPARATUS FOR DELIVERING PRECISE TRAPS AND INTERRUPTS IN AN OUT-OF-ORDER PROCESSOR filed concurrently herewith by Ramesh Panwar; Ser. No. 08/881,728 for NON-BLOCKING HIERARCHICAL CACHE THROTTLE filed concurrently herewith by Ricky C. Hetherington and Thomas M. Wicki; Ser. No. 08/881,727 for NON-THRASHABLE NON-BLOCKING HIERARCHICAL CACHE filed concurrently herewith by Ricky C. Hetherington, Sharad Mehrotra and Ramesh Panwar; Ser. No. 08/881,065 for IN-LINE BANK CONFLICT DETECTION AND RESOLUTION IN A MULTI-PORTED NON-BLOCKING CACHE filed concurrently herewith by Ricky C. Hetherington, Sharad Mehrotra and Ramesh Panwar; and Ser. No. 08/882,613 for SYSTEM FOR THERMAL OVERLOAD DETECTION AND PREVENTION FOR AN INTEGRATED CIRCUIT PROCESSOR filed concurrently herewith by Ricky C. Hetherington and Ramesh Panwar, the disclosures of which applications are herein incorporated by this reference.

BACKGROUND OF THE INVENTION

The present invention relates, in general, to the field of microprocessor design and the issuance of memory instructions therefor. More particularly, the present invention relates to a system, apparatus and method for restraining over-eager load boosting past stores in an out-of-order processor.

Early computer processors (also called microprocessors) included a central processing unit or instruction execution unit that executed only one instruction at a time. As used herein the term processor includes complete instruction set computers ("CISC"), reduced instruction set computers ("RISC") and hybrids. In response to the need for improved performance several techniques have been used to extend the capabilities of these early processors including pipelining, superpipelining, superscaling, speculative instruction execution, and out-of-order instruction execution.

Pipelined architectures break the execution of instructions into a number of stages where each stage corresponds to one step in the execution of the instruction. Pipelined designs increase the rate at which instructions can be executed by allowing a new instruction to begin execution before a previous instruction is finished executing. Pipelined architectures have been extended to "superpipelined" or "extended pipeline" architectures where each execution pipeline is broken down into even smaller stages (i.e., microinstruction granularity is increased). Superpipelining increases the number of instructions that can be executed in the pipeline at any given time.

"Superscalar" processors generally refer to a class of microprocessor architectures that include multiple pipelines that process instructions in parallel. Superscalar processors typically execute more than one instruction per clock cycle, on average. Superscalar processors allow parallel instruction execution in two or more instruction execution pipelines. The number of instructions that may be processed is increased due to parallel execution. Each of the execution pipelines may have differing number of stages. Some of the pipelines may be optimized for specialized functions such as integer operations or floating point operations, and in some cases execution pipelines are optimized for processing graphic, multimedia, or complex math instructions.

The goal of superscalar and superpipeline processors is to execute multiple instructions per cycle ("IPC"). Instruction-level parallelism ("ILP") available in programs can be exploited to realize this goal, however, this potential parallelism requires that instructions be dispatched for execution at a sufficient rate. Conditional branching instructions create a problem for instruction fetching because the instruction fetch unit ("IFU") cannot know with certainty which instructions to fetch until the conditional branch instruction is resolved. Also, when a branch is detected, the target address of the instructions following the branch must be predicted to supply those instructions for execution.

Recent processor architectures use a branch prediction unit to predict the outcome of branch instructions allowing the fetch unit to fetch subsequent instructions according to the predicted outcome. Branch prediction techniques are known that can predict branch outcomes with greater than 95% accuracy. These instructions are "speculatively executed" to allow the processor to make forward progress during the time the branch instruction is resolved. When the prediction is correct, the results of the speculative execution can be used as correct results, greatly improving processor speed and efficiency. When the prediction is incorrect, the completely or partially executed instructions must be flushed from the processor and execution of the correct branch initiated.

Early processors executed instructions in an order determined by the compiled machine-language program running on the processor and so are referred to as "in-order" or "sequential" processors. In superscalar processors multiple pipelines can simultaneously process instructions only when there are no data dependencies between the instructions in each pipeline. Data dependencies cause one or more pipelines to "stall" waiting for the dependent data to become available. This is further complicated in superpipelined processors where, because many instructions are executed simultaneously in each pipeline, the potential quantity of data dependencies is large. Hence, greater parallelism and higher performance are achieved by "out-of-order" processors that include multiple pipelines in which instructions are processed in parallel in any efficient order that takes advantage of opportunities for parallel processing that may be provided by the instruction code.

Although out-of-order processing greatly improves throughput, it also increases complexity as compared to simple sequential processors. In fact, due to out-of-order instruction scheduling, a load instruction may be boosted past an older store which stores data to the same location. In this case, the load may hit in the cache and return an older value. Such cases need to be detected and corrected to ensure correct program execution.

Because of this, conventional process design simply allowed for memory instructions to be issued in order so that they can resolve in order. Nevertheless, in those instances where register space is unavailable and program code issues a store to a certain memory location instead (i.e. "register spilling")and then loads from the same location it is possible that the program compiler may not be able to determine that the store and load would map to the same memory location. This is referred to as a lack of memory disambiguation or lack of knowledge as to how the program addresses itself with what is actually mapped. Stated another way, the memory location map was constructed without knowledge that the store and load instructions were directed to the same memory location.

In out-of-order instruction execution, memory instructions may be issued in any order, including loads and stores. In this regard, copending U.S. patent application Ser. No. 08/882,311 entitled AN APPARATUS AND METHOD FOR MAINTAINING PROGRAM CORRECTNESS WHILE ALLOWING LOADS TO BE BOOSTED PAST STORES IN AN OUT-OF-ORDER MACHINE concurrently herewith by Ramesh Panwar, P. K. Chidambaran, and Ricky C. Hetherington discloses a system, apparatus and method for ensuring program correctness in an out-of-order processor despite younger loads being boosted past an older store, through the use of a memory disambiguation buffer ("MDB"). The memory disambiguation buffer stores all memory operations that have not yet been retired. Each entry has several fields amongst which are the data and the addresses of the memory operations. An incoming load checks its address against the addresses of all the stores. If there is a match against an older store, then the load must have received old data from the data cache and the load operation is replayed to seek data from the memory disambiguation buffer on the replay. If on the other hand, there were no matches on any older store, the load is assumed to have received the right data from the data cache (assuming a data cache hit). An incoming store checks its address against the addresses of all younger loads. If there is a match against any younger load, then the younger load is replayed along with all of its dependents.

Through the use of this type of speculative out-of-order execution of memory instructions, younger loads can be boosted past older stores and the memory disambiguation buffer exists to allow correct program execution. The memory disambiguation buffer replays (or rewinds) any load (and its chain of dependents) that were boosted past a colliding store due to over-eager scheduling. However, a penalty is exacted on the execution performance due to the rewind and replay of such loads and their dependents. Therefore, a means for restraining over-eager load boosting is required.

SUMMARY OF THE INVENTION

The system, apparatus and method of the present invention restrains over-eager load boosting in an out-of-order processor through the implementation of a special "coloring" mechanism that colors dependent load and store instructions to ensure recognition of a dependency based on the assignment of a common multi-bit "color" scheme. In the exemplary embodiment disclosed herein, two bits of color are assigned to load and store instructions. These color bits are stored in a special array and are read when the load or store is read from the instruction cache ("I$"). The encoding of "00" for a load, for example, may indicate no coloring dependency for the load. Any encoding other than a "00" is utilized to indicate a store-load dependency for a store and load of the same color. The color bits for the load and store instructions are updated when a read-after-write ("RAW") hazard is detected by the memory disambiguation buffer ("MDB") for a store-load pair. The processor dependency tracking logic will enforce a dependency between a store and load of the same color (other than "00") and the instruction scheduling window ("ISW") will not boost the load past the store. Moreover, the instruction scheduling window will schedule the load for fetching data from the memory disambiguation buffer rather than the data cache ("D$").

Particularly disclosed herein is a system for restraining over-eager boosting of load instructions past store instructions in an out-of-order processor. The system comprises a memory disambiguation buffer for storing load and store instruction addresses and associated data and an instruction scheduling window in operative association with the memory disambiguation buffer. The instruction scheduling window and the memory disambiguation buffer determine load/store dependencies and effectuate replay of the store and load instructions wherein a dependent load instruction has been executed prior to a store instruction. An instruction cache is provided in operative association with the memory disambiguation buffer. The instruction cache and the memory disambiguation buffer are operative to thereafter associate the dependent load instructions with a store instruction such that the store instruction is subsequently executed prior to the dependent load instructions. In a particular embodiment, the replay of the load instruction takes place utilizing the associated data in the memory disambiguation buffer.

Further disclosed herein is a method for ensuring that a dependent load instruction is not again executed prior to an associated store instruction in an out-of-order processor. The method comprises the steps of enqueuing addresses and data of unretired load and store instructions in a buffer, checking an address of an incoming load instruction against the enqueued addresses of store instructions and setting at least one indicator bit associated with the incoming load instruction and an enqueued older store instruction if a match is determined between the incoming load instruction address and the enqueued older store instruction address. The method further comprises the steps of initiating replay of the incoming load instruction and the older store instruction, noting the at least one indicator bit associated with the incoming load instruction and the older store instruction are set and ensuring that the older store instruction is executed prior to the incoming load instruction.

Still further disclosed herein is another method for ensuring that a dependent load instruction is not again executed prior to an associated store instruction in an out-of-order processor. The method comprises the steps of enqueuing addresses and data of unretired load and store instructions in a buffer, checking an address of an incoming store instruction against the enqueued addresses of younger load instructions and setting at least one indicator bit associated with the incoming store instruction if a match is determined between the incoming store instruction address and the enqueued younger load instruction address. The method further comprises the steps of initiating replay of the incoming store instruction and the younger load instruction, noting the at least one indicator bit associated with the incoming store instruction and the younger load instruction are set and ensuring that the incoming store instruction is executed prior to the younger load instruction.

BRIEF DESCRIPTION OF THE DRAWINGS

The aforementioned and other features and objects of the present invention and the manner of attaining them will become more apparent and the invention itself will be best understood by reference to the following description of an exemplary embodiment taken in conjunction with the accompanying drawings, wherein.

DESCRIPTION OF AN EXEMPLARY EMBODIMENT

Figure 1:
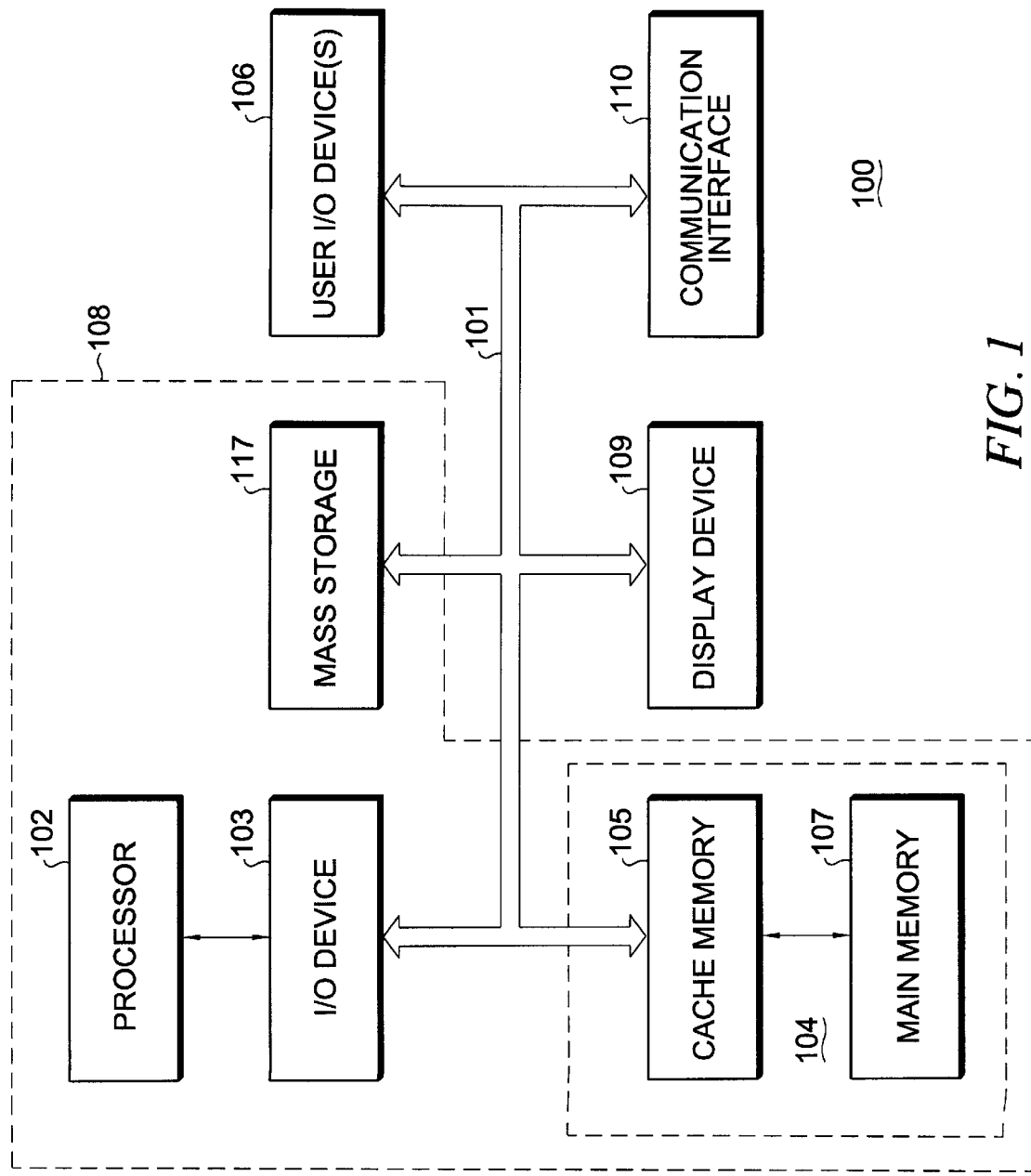
FIG. 1 is a functional block diagram of a computer system incorporating an apparatus and system in accordance with the present invention.

Processor architectures can be represented as a collection of interacting functional units as shown in FIG. 1. These functional units, discussed in greater detail below, perform the functions of fetching instructions and data from memory, preprocessing fetched instructions, scheduling instructions to be executed, executing the instructions, managing memory transactions, and interfacing with external circuitry and devices.

Figure 2:
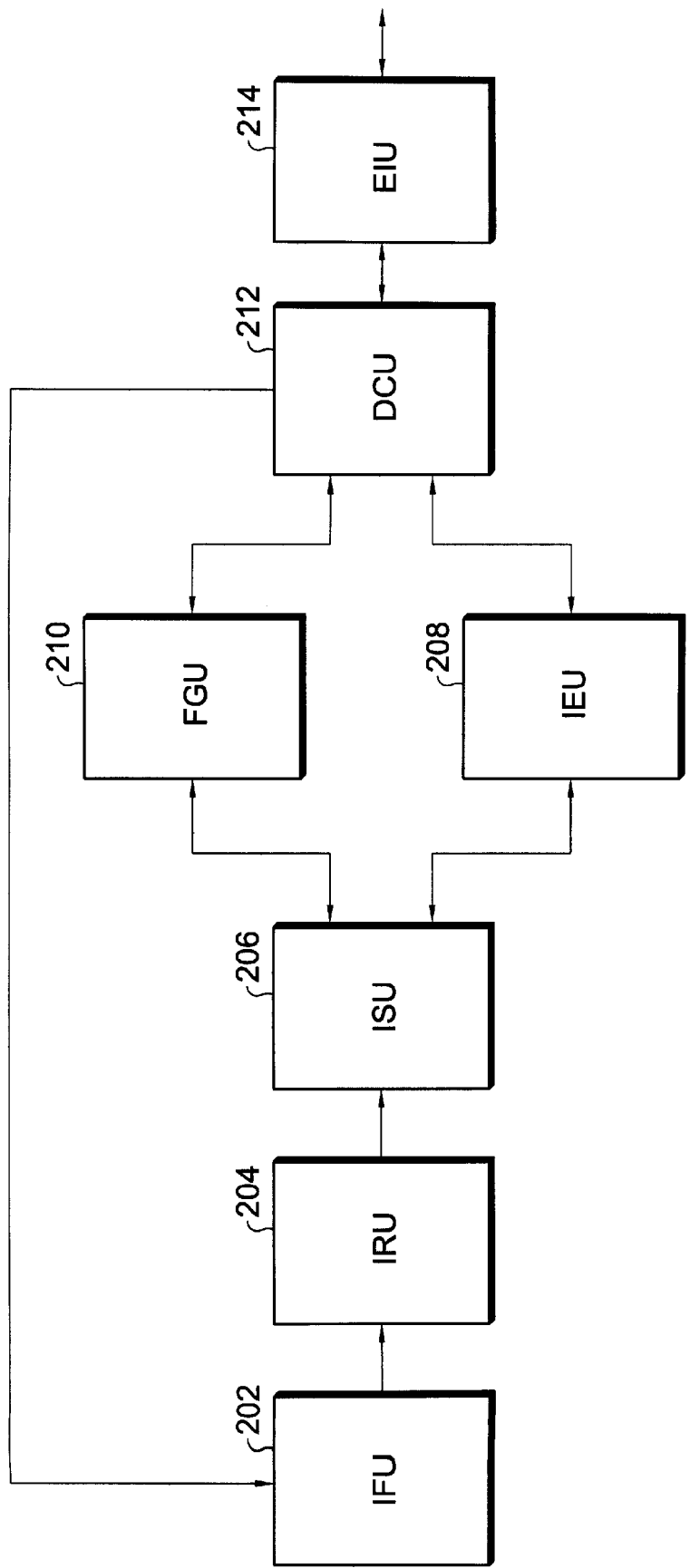
FIG. 2 is a functional block diagram of a processor incorporating an apparatus and method in accordance with the present invention.

The present invention is described in terms of apparatus and methods particularly useful in a superpipelined and superscalar processor 102 shown in block diagram form in FIG. 1 and FIG. 2. The particular examples represent implementations useful in high clock frequency operation and processors that issue and execute multiple instructions per cycle ("IPC"). However, it is expressly understood that the inventive features of the present invention may be usefully embodied in a number of alternative processor architectures that will benefit from the performance features of the present invention. Accordingly, these alternative embodiments are equivalent to the particular embodiments shown and described herein.

FIG. 1 shows a typical general purpose computer system 100 incorporating a processor 102 in accordance with the present invention. Computer system 100 in accordance with the present invention comprises an address/data bus 101 for communicating information, processor 102 coupled with bus 101 through input/output ("I/O") device 103 for processing data and executing instructions, and memory system 104 coupled with bus 101 for storing information and instructions for processor 102. Memory system 104 comprises, for example, cache memory 105 and main memory 107. Cache memory 105 includes one or more levels of cache memory. In a typical embodiment, processor 102, I/O device 103, and some or all of cache memory 105 may be integrated in a single integrated circuit, although the specific components and integration density are a matter of design choice selected to meet the needs of a particular application.

User I/O devices 106 are coupled to bus 101 and are operative to communicate information in appropriately structured form to and from the other parts of computer 100. User I/O devices may include a keyboard, mouse, card reader, magnetic or paper tape, magnetic disk, optical disk, or other available input devices, including another computer. Mass storage device 117 is coupled to bus 101 may be implemented using one or more magnetic hard disks, magnetic tapes, CDROMs, large banks of random access memory, or the like. A wide variety of random access and read only memory technologies are available and are equivalent for purposes of the present invention. Mass storage 117 may include computer programs and data stored therein. Some or all of mass storage 117 may be configured to be incorporated as a part of memory system 104.

In a typical computer system 100, processor 102, I/O device 103, memory system 104, and mass storage device 117, are coupled to bus 101 formed on a printed circuit board and integrated into a single housing as suggested by the dashed-line box 108. However, the particular components chosen to be integrated into a single housing is based upon market and design choices. Accordingly, it is expressly understood that fewer or more devices may be incorporated within the housing suggested by dashed line 108.

Display device 109 is used to display messages, data, a graphical or command line user interface, or other communications with the user. Display device 109 may be implemented, for example, by a cathode ray tube (CRT) monitor, liquid crystal display (LCD) or any available equivalent.

FIG. 2 illustrates principle components of processor 102 in greater detail in block diagram form. It is contemplated that processor 102 may be implemented with more or fewer functional components and still benefit from the apparatus and methods of the present invention unless expressly specified herein. Also, functional units are identified using a precise nomenclature for ease of description and understanding, but other nomenclature often is often used to identify equivalent functional units.

Instruction fetch unit ("IFU") 202 comprises instruction fetch mechanisms and includes, among other things, an instruction cache for storing instructions, branch prediction logic, and address logic for addressing selected instructions in the instruction cache. The instruction cache is commonly referred to as a portion ("I$") of the level one ("L1") cache with another portion ("D$") of the L1 cache dedicated to data storage. IFU 202 fetches one or more instructions at a time by appropriately addressing the instruction cache. The instruction cache feeds addressed instructions to instruction rename unit ("IRU") 204. Preferably, IFU 202 fetches multiple instructions each cycle and in a specific example fetches eight instructions each cycle.

In the absence of conditional branch instruction, IFU 202 addresses the instruction cache sequentially. The branch prediction logic in IFU 202 handles branch instructions, including unconditional branches. An outcome tree of each branch instruction is predicted using any of a variety of available branch prediction algorithms and mechanisms. More than one branch can be predicted simultaneously by supplying sufficient branch prediction resources. After the branches are predicted, the predicted address is applied to the instruction cache rather than the next sequential address.

IRU 204 comprises one or more pipeline stages that include instruction renaming and dependency checking mechanisms. The instruction renaming mechanism is operative to map register specifiers in the instructions to physical register locations and to perform register renaming to prevent false dependencies. IRU 204 further comprises dependency checking mechanisms that analyze the instructions to determine if the operands (identified by the instructions' register specifiers) cannot be determined until another "live instruction" has completed. The term "live instruction" as used herein refers to any instruction that has been fetched from the instruction cache but has not yet completed or been retired. IRU 204 outputs renamed instructions to instruction scheduling unit (ISU) 206.

Program code may contain complex instructions, also called "macroinstructions", from the running object code. It is desirable in many applications to break these complex instructions into a plurality of simple instructions or "microinstructions" to simplify and expedite execution. In a specific implementation, the execution units are optimized to precisely handle instructions with a limited number of dependencies using a limited number of resources (i.e., registers). Complex instructions include any instructions that require more than the limited number of resources or involve more than the limited number of dependencies. IRU 204 includes mechanisms to translate or explode complex instructions into a plurality of microinstructions. These microinstructions are executed more efficiently in the execution units (e.g., floating point and graphics execution unit ("FGU") 208 and integer execution unit ("IEU") 214) than could the macroinstructions.

ISU 206 receives renamed instructions from IRU 204 and registers them for execution. Upon registration, instructions are deemed "live instructions" in the specific example. ISU 206 is operative to schedule and dispatch instructions as soon as their dependencies have been satisfied into an appropriate execution unit (e.g., integer execution unit (IEU) 208 or floating point and graphics unit (FGU) 210). ISU 206 also maintains the trap status of live instructions. ISU 206 may perform other functions such as maintaining the correct architectural state of processor 102, including state maintenance when out-of-order instruction processing is used. ISU 206 may include mechanisms to redirect execution appropriately when traps or interrupts occur and to ensure efficient execution of multiple threads where multiple threaded operation is used. Multiple thread operation means that processor 102 is running multiple substantially independent processes simultaneously. Multiple thread operation is consistent with but not required by the present invention.

ISU 206 also operates to retire executed instructions when completed by IEU 208 and FGU 210. ISU 206 performs the appropriate updates to register files and control registers upon complete execution of an instruction. ISU 206 is responsive to exception conditions and discards operations being performed on instructions subsequent to an instruction generating an exception in the program order. ISU 206 quickly removes instructions from a mispredicted branch and initiates IFU 202 to fetch from the correct branch. An instruction is retired when it has finished execution and all instructions from which it depends have completed. Upon retirement the instruction's result is written into the appropriate register file and it is no longer deemed a "live instruction".

IEU 208 includes one or more pipelines, each comprising one or more stages that implement integer instructions. IEU 208 also includes mechanisms for holding the results and state of speculatively executed integer instructions. IEU 208 functions to perform final decoding of integer instructions before they are executed on the execution units and to determine operand bypassing amongst instructions in an out-of-order processor. IEU 208 executes all integer instructions including determining correct virtual addresses for load/store instructions. IEU 208 also maintains correct architectural register state for a plurality of integer registers in processor 102. IEU 208 preferably includes mechanisms to access single and/or double precision architectural registers as well as single and/or double precision rename registers.

FGU 210, includes one or more pipelines, each comprising one or more stages that implement floating point instructions. FGU 210 also includes mechanisms for holding the results and state of speculatively executed floating point and graphic instructions. FGU 210 functions to perform final decoding of floating point instructions before they are executed on the execution units and to determine operand bypassing amongst instructions in an out-of-order processor.

In the specific example, FGU 210 includes one or more pipelines dedicated to implement special purpose multimedia and graphic instructions that are extensions to standard architectural instructions for a processor. FGU 210 may be equivalently substituted with a floating point unit (FPU) in designs in which special purpose graphic and multimedia instructions are not used. FGU 210 preferably includes mechanisms to access single and/or double precision architectural registers as well as single and/or double precision rename registers.

A data cache memory unit ("DCU") 212 including cache memory 105 shown in FIG. 1 functions to cache memory reads from off-chip memory through external interface unit ("EIU") 214. Optionally, DCU 212 also caches memory write transactions. DCU 212 comprises one or more hierarchical levels of cache memory and the associated logic to control the cache memory. One or more of the cache levels within DCU 212 may be read only memory to eliminate the logic associated with cache writes.

Figure 3:
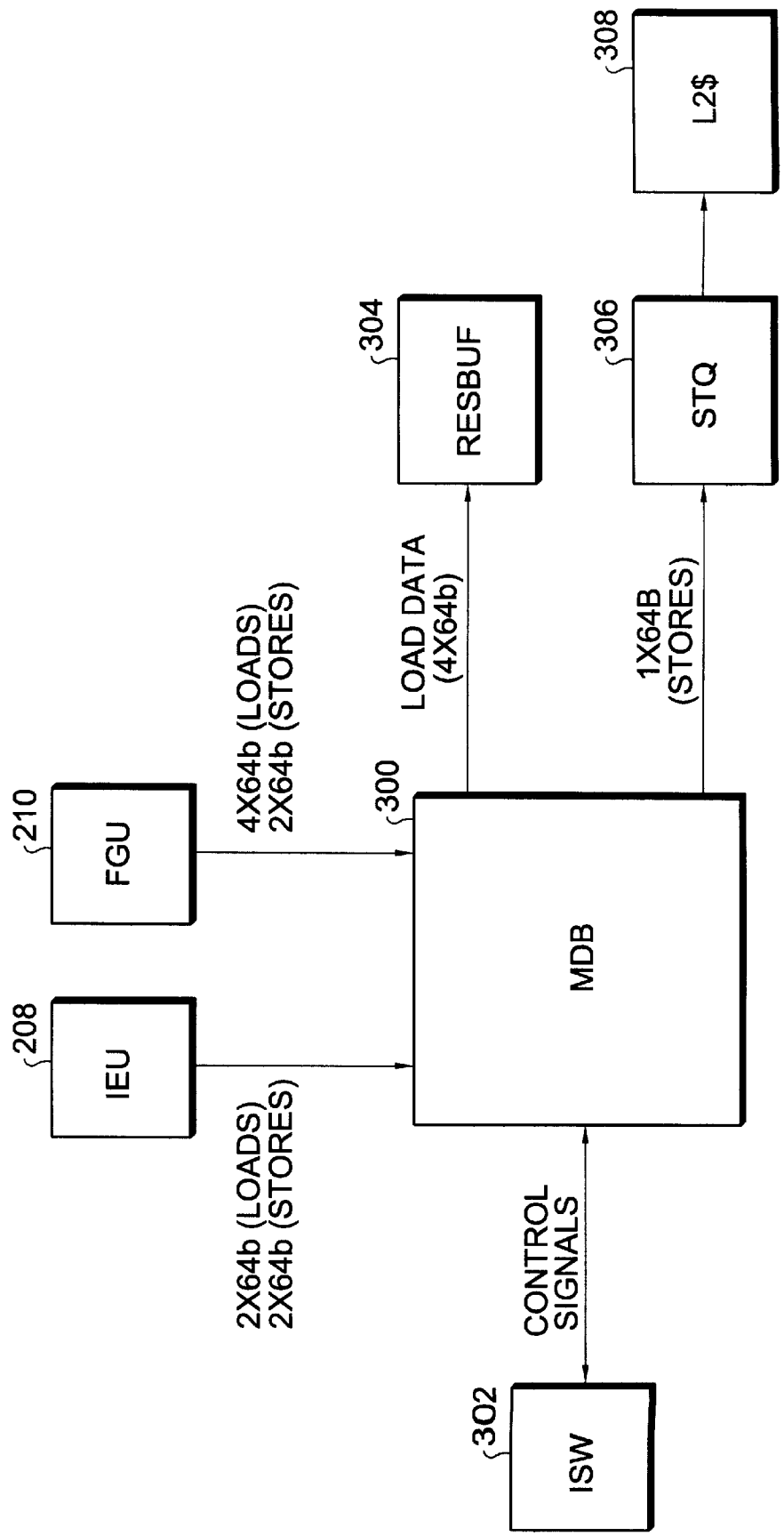
FIG. 3 is a more detailed functional block diagram of a portion of the processor of FIG. 2 illustrating a memory disambiguation buffer ("MDB") and instruction scheduling window ("ISW") in accordance with the present invention and its interrelationship to other functional elements.

With reference now to FIG. 3, a memory disambiguation buffer ("MDB") 300 is shown which may be integrated as a portion of the integrated circuit processor of the preceding figures to form a portion of an exemplary implemention of the system and method of the present invention. In a processor as above-described in which loads and stores may be issued out-of-order with all other instructions inclusive of memory operations and the resolution of data dependencies among memory operations. The MDB 300 serves to queue all memory load and store instructions and, in the exemplary implementation herein disclosed may comprise a 64 entry content addressable memory ("CAM") with 4 write ports/2 read ports; a data array for each entry (4 read ports/2 write ports) as well as associated control and other logic.

As shown, the MDB 300 (which may form a portion of the IRU 204 of FIG. 2), is coupled to an instruction scheduling window ("ISW") 302 (which, in turn, may form a portion of the IRU 204 and ISU 206 of FIG. 2) which will be more fully described hereinafter. The MDB 300 is also coupled to the IEU 208 and FGU 210, receiving 2×64b (loads) and 2×64b (stores) from the former and 4×64b (loads) and 2×64b (stores) from the latter. A results buffer 304 receives load data (4×64b) from the MDB 300 while a store queue ("STQ") 306 receives 1×64b (stores). The STQ 306 will be more fully described hereinafter with respect to FIG. 5. The STQ 306 is coupled to the level 2 cache ("L2$").

Functionally, the MDB 300 is employed to allow more parallelism and greater out of order execution of loads and stores. In the simplest terms, it is responsible for bypassing data from older stores to younger loads. It is also responsible for identifying when incorrect data has been bypassed due to the internally relaxed memory ordering as well as when an unpredicted Read After Write ("RAW") occurs.

The MDB 300 interfaces with the instruction scheduling window 302, L1 cache, miss address file (not shown) and the result buffer 304. It interfaces with the ISW 302 for purposes of flushing younger loads from the pipe and also to determine when an instruction load or store will retire from the window. All loads will return data to the result buffer 304. All stores, when retired from the instruction scheduling window 302 are directed to the STQ 306 and then to the L2 cache 308. If a store misses the L1 cache, it may be dropped and only the store to the L2 cache 308 will proceed. Store data to the MDB 300 will come from either the IEU 208 or the FGU 210.

The instruction scheduling window 302 issues stores only when both the address and data are known. Any instruction which can effect the memory hierarchy (such as altering the state of the Translation Look-aside Buffer ("TLB")) will be issued in order with respect to loads and stores.

Figure 4:
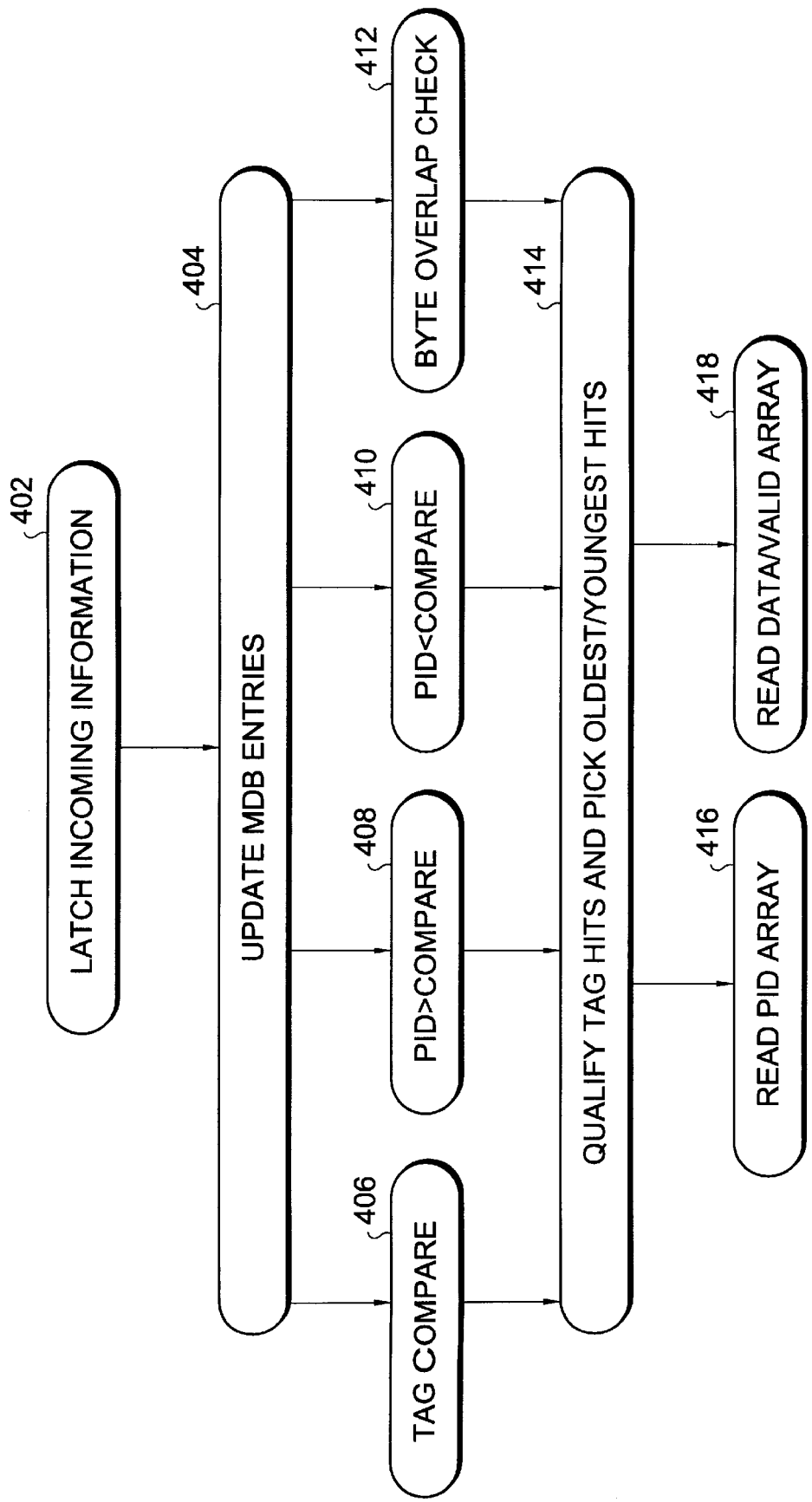
FIG. 4 is a simplified logic flowchart of the operation of the MDB of FIG. 3.

With reference additionally now to FIG. 4, a logic flow chart illustrating the overall functionality of the MDB 300 is shown. The MDB process 400 begins at step 402 to latch incoming information regarding memory operations. This information is then utilized to update the MDB 300 entries at step 404 followed by a tag compare operation at step 406. At step 408, the producer identification ("PID") of the entries is checked to determine if it is greater than that of other entries and at step 410 to determine if it is less than. A byte overlap step is performed at step 412 as will be more fully described hereinafter. At step 414, the tag hits are qualified and the oldest and youngest hits are picked. Thereafter, at steps 416 and 418 the PID array is read and the data/valid array read respectively.

With respect to step 408 in particular, a PID magnitude comparator may be utilized to compare stores against younger loads: [PID>=PID less than]. For example, a PID checker can be implemented for this purpose which provides an output of "1" when the PID of the store is greater than the PID of the load. In like manner with respect to step 410, a magnitude comparator may also be utilized to compare loads against older stores: [PID<=PID more than]. Again, a PID checker may be implemented to provide an output of 1 when the PID of the load is less than the PID of the store.

The MDB 300 may also include a mask overlap unit which compares the bytemask of the load against the bytemask of the stores in the buffer. If there is no overlap of any bytemask, no bypassing or flushing action is performed by the MDB 300. Similarly, a mask match unit may be implemented since when loads are being compared against older stores, it must be ensured that the bypassing store is supplying all of the data for the requesting load. For this reason, valid bits (bytemasks) of the data coming out of the data array are compared with the bytemasks of the load inside the mask match unit. If the load bytemask is a subset of the data_out bytemasks, then the valid bit for the load data is set, otherwise the data from the buffer is determined to be invalid. For this comparison, the 8-bit bytemasks of the load and the data out may be bit-wise ANDed and the output compared with the load bytemask. If the comparison matches, then the data coming out of the buffer (ld_data_out) is valid.

As previously described, all four ports of the MDB 300 are identical and can service either loads or stores. If only two of the ports (e.g. Port0 and Port2) service stores, the design may be simplified. Only those flops which had hits in the physical address content addressable memory ("CAM") are enabled. This serves to reduce the power consumption of this array considerably. CAM compares should be qualified with a load/store bit so that loads do not compare to loads and stores do not compare to stores.

Since at any time there may be a mix of incoming loads and stores, these must also be checked among themselves. All the same conditions must be checked under all of the same restrictions of age as for the loads and stores already enqueued, and the new instructions may be enqueued and checked against themselves.

Because "loads" look only at "stores" and "stores" look only at "loads", there is no possibility of a false hit being registered. In addition, the PID range checks look for "younger" or "older" but do not return a hit for "same age as" since there is no bypass condition for a load to itself. When the new group of instructions contains two unpredicted RAW hazards which require flushing, the PID of the oldest incorrect load needs to be provided for flushing. This means that all the CAM matches for stores should be OR'd together before going to the "pick oldest" logic which would then the yield the oldest incorrect load's PID.

Figure 5:
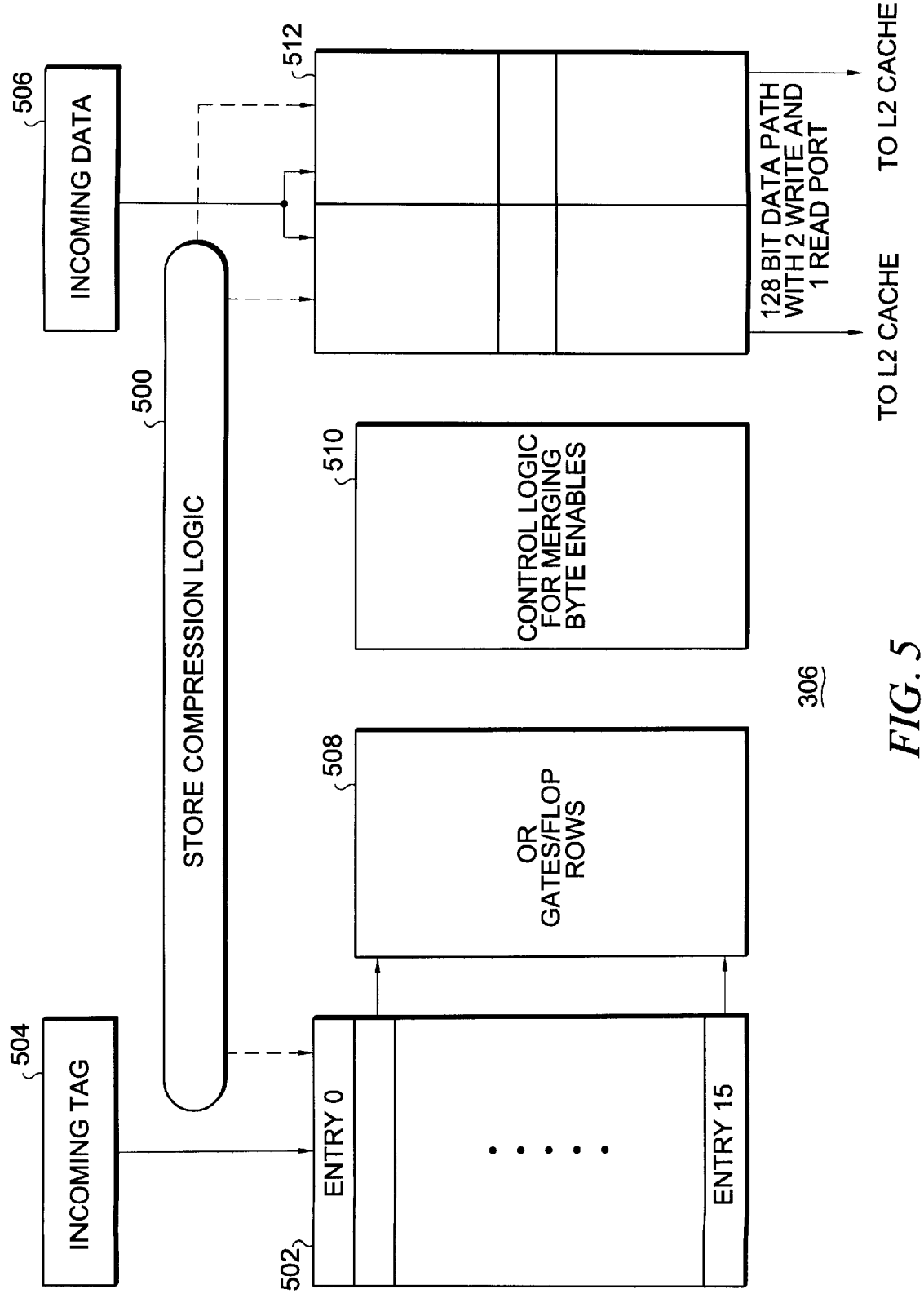
FIG. 5 is a functional block diagram of the store queue ("STQ") of FIG. 3.

With reference additionally now to FIG. 5, the STQ 306 of FIG. 3 is illustrated in greater detail. The STQ 306 comprises, in pertinent part store compression logic 500 and incoming tag 504 information which supplies inputs to a 16 entry store buffer 502. The buffer 502 is coupled to a number of OR gates/Flop rows 508 which have an associated control logic block 510 for merging byte enables. The STQ306 further comprises an incoming data block 506 which, with the store compression logic 500 provides inputs to a block 512 which provides a 128 bit data path with 2 write and 1 read port for input to the L2 cache 308 (FIG. 3).

In operation, once a store is retired, it is moved from the MDB 300 into the STQ 306 buffer 502. Utilizing a 16 entry buffer 502 as shown in this exemplary illustration, enables byte, halfword, word and doubleword writes to the L2 cache 308. Implementing a "write invalidate" policy, both L1 cache copies are invalidated on a L2 cache 308 write. To improve L2 bandwidth, stores within a 128 bit boundary may be compressed utilizing the store compression logic 500 and one store may be retired per cycle. If an incoming store address matches an entry in the STQ 306 buffer 502, then the incoming store data may be merged (and written over) into the corresponding location. If there are members between two stores, then store compression will not be performed.

Figure 6:
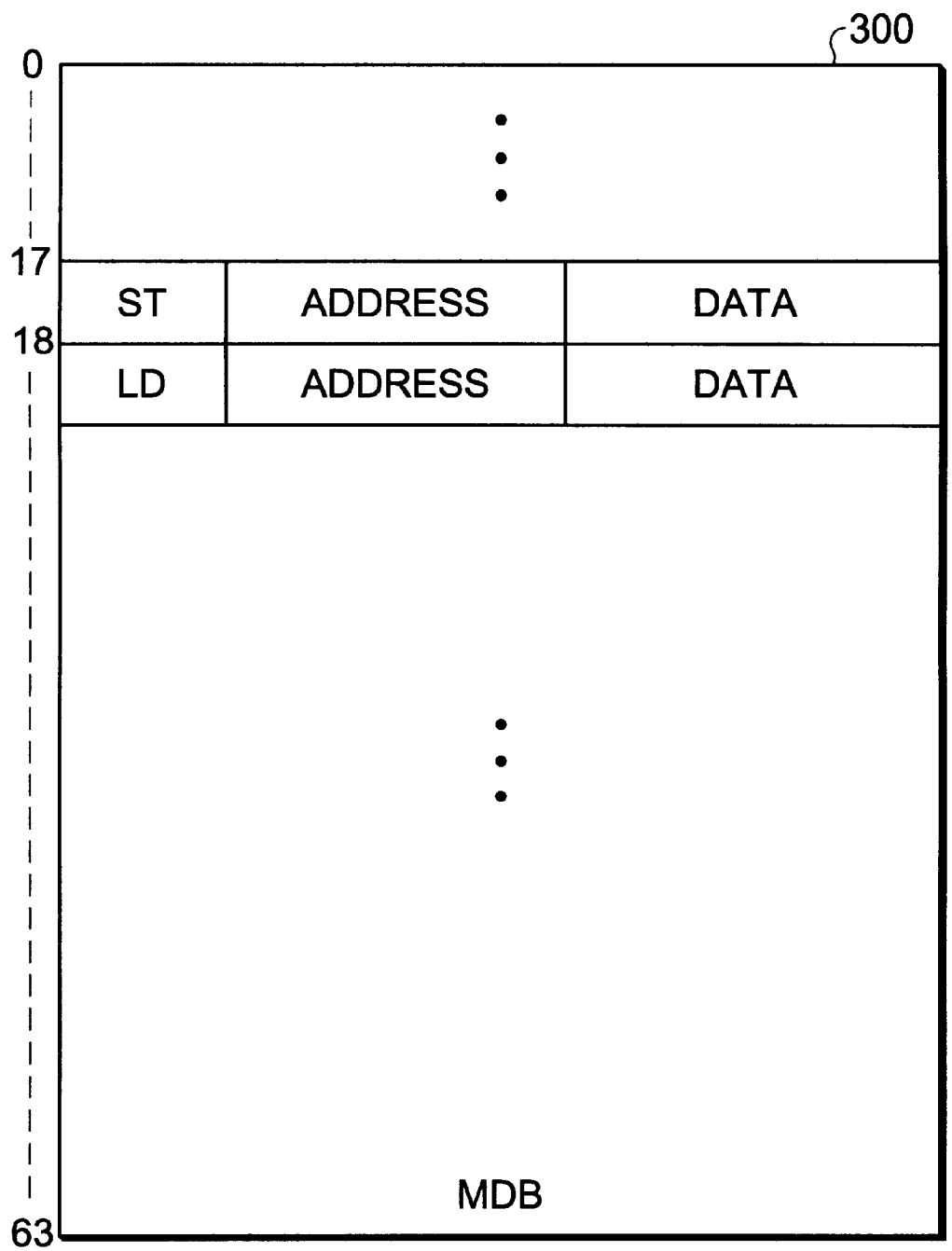
FIG. 6 is a more detailed view of the embodiment of the MDB shown in the preceding figures illustrating a number of memory instructions including an exemplary sequence of "Add", "Store" ("ST") and "Load" ("LD") operations useful in understanding the operation of the MDB.
Figure 7:
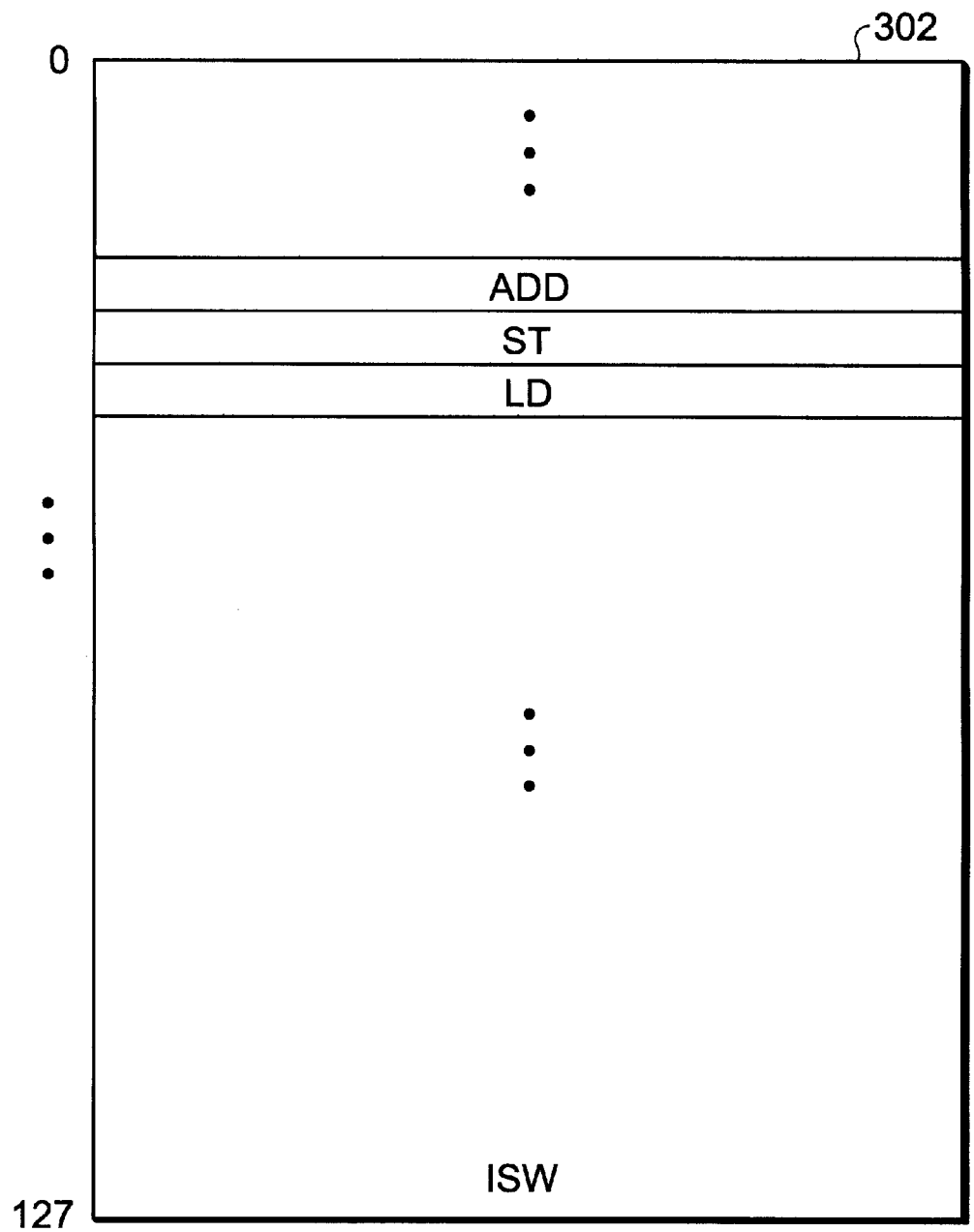
FIG. 7 is a more detailed view of the embodiment of the ISW shown in the preceding figures illustrating the relative size of the ISW to that of the MDB.

With reference now to FIGS. 6 and 7, an exemplary apparatus and method which may form a portion of an implementation of the present invention is shown. Consider the following instructions in program order:

| Add | R0, | R5 | R8 |
| ST  | R8, | R6 | R10 |
| LD  | R8, | R9 | R13 |

In SPARC™ programming language, the above store instruction equates to: store the value in register 10 to the address pointed to by the value of register 8 plus the value of register 6. In like manner, the load instruction is equivalent to: load the value in register 13 from the address pointed to by the value of register 8 plus the value of register 9. In an out-of-order processor as herein disclosed, loads and store may be scheduled in any order, that is, the load instruction may be boosted past the older store which, where R8+R9=R8+R6 is the same location. The processor dependency checking logic provides no means for determining the fact that both the load and the store mapped to the same address and in this example, both the load and the store instructions are dependent upon the add (R8) as well as a load/store dependency.

Thus, although in program order the store instruction should be executed prior to the load, in an out-of-order processor, the load instruction may actually get scheduled for execution ahead of the store. In conventional processor designs in which memory instructions are issued and retired in order, this problem would not exist.

The MDB 300, in the exemplary embodiment shown in FIG. 6, may comprise a 64 entry buffer. As instructions come down the processor pipeline, a slot is allocated in the MDB 300 for each instruction by the resource allocation and pipeline tracking logic. As the resource allocation logic notes a store instruction, it allocates a lot in the buffer for the store instruction, for example, slot 17 as shown. Since the load instruction follows the store, the next slot is allocated for it as slot 18.

As shown, in FIG. 7, the instruction scheduling window 302 is also associated with the MDB 300. In the exemplary implementation shown, the ISW 302 may include 128 entries and would hold the add, store and load instructions previously described. However, since the dependency of the load on the store could not be determined, the load instruction may be scheduled ahead of the store and the load would have retrieved stale data from the data cache. A cycle or two later, the store instruction may be scheduled and the store will store data to the same location from which the load returned data.

To correct this, when the load instruction was initially scheduled, it enters its address in the MDB 300 (i.e. computes the value of R8+R9) at the same time as it accesses the data cache. When the store instruction comes down the processor pipeline thereafter, it computes it address (i.e. R8+R6) and checks it against all younger loads. In this example, a match would be found and a determination is made that a younger load got data passed to it from the cache and the ISW 302 is then requested to replay that load operation from slot 18 on down. When the replay occurs, it will then occur such that the data (also maintained in the MDB 300) will be expected from the MDB 300. In other words, the ISW 302 would be informed that the replay is occurring such that the requisite data would be returned from the MDB 300 for the particular load operation in question.

A determination as to whether a store is younger than a load (load older than a store) or store is older than a load (load younger than a store) is by reference to program order and the instructions are tagged and marked with an entry point in the MDB 300 that is consistent with program order. The complete address in the MDB 300 includes the address and a header.

In the example previously described, the load was younger than the store although the MDB 300 will also function to disambiguate loads which are older than a store. Moreover, although in the example shown, the load immediately followed the store in program order, the instructions need not be in sequential order but need only be resident in the MDB 300 concurrently. Entries in the MDB 300 continue to be maintained until it is scheduled for execution and retired.

The size of the MDB 300 utilized is primarily a function of the anticipated throughput of the overall processor and the amount of on-chip die area available. If the MDB 300 is too small, it will stall when the ISW 302 is filled with load and store instructions. Conversely, if the MDB 300 is the same size as the ISW 302, then a significant amount of on-chip resources may remain idle a significant portion of the time depending on the instructions issued by the processor. As a practical matter the MDB 300 should approximate the number of outstanding loads and stores in the processor since each has to have an entry in it.

As stated previously, the MDB 300 compares incoming loads against stores in a buffer for read after write ("RAW") detection and bypassing and compares incoming stores against loads in the buffer for identifying whether incorrect data has been bypassed to a younger load due to the internally relaxed memory ordering.

Figure 8:
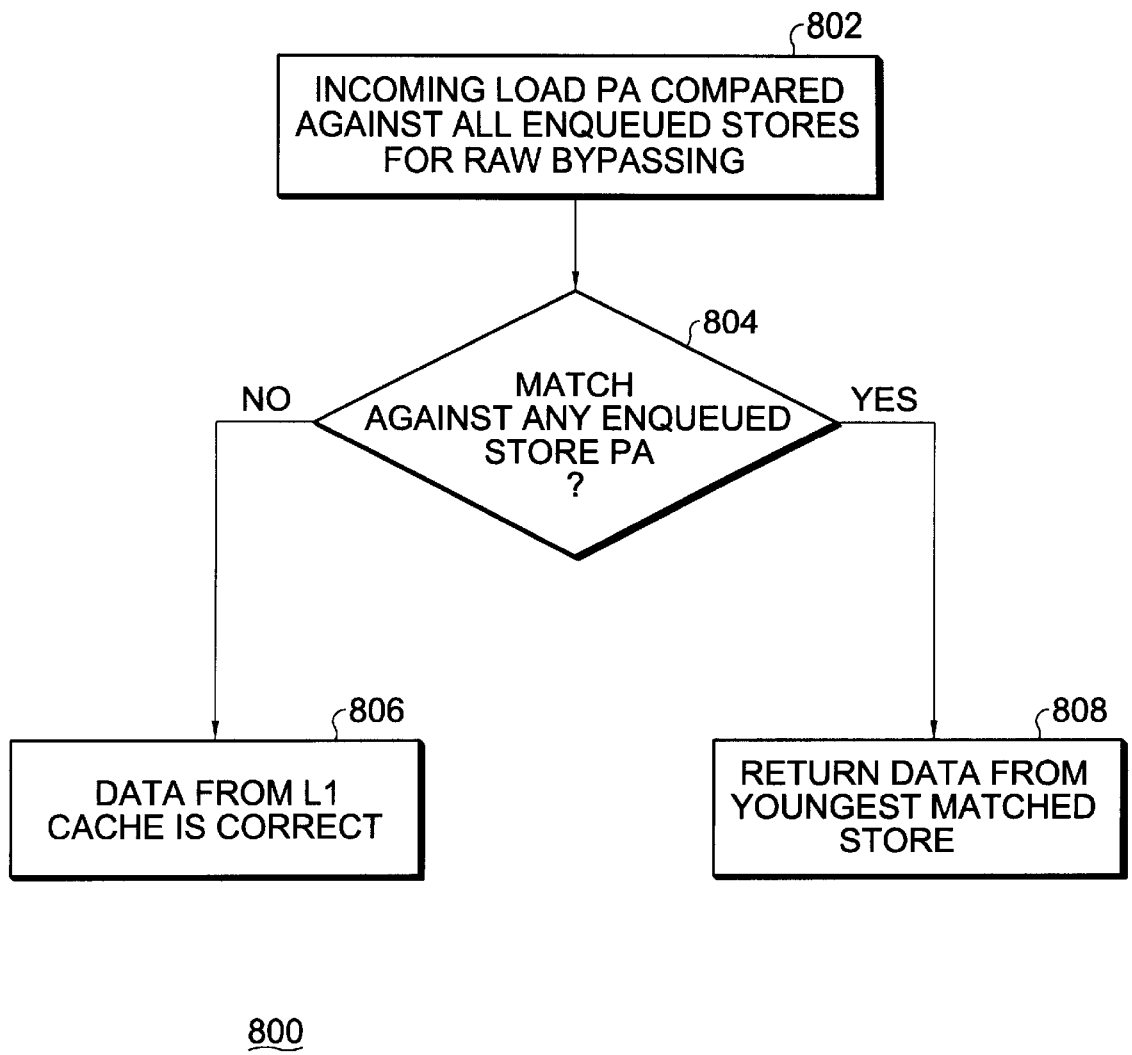
FIG. 8 is a simplified logic flow representation of the functionality of the MDB of the preceding figures upon the detection of an incoming load operation.

This functionality is illustrated in greater detail with respect to FIG. 8 and the following pseudocode:

//Incoming load (LD) physical addresses ("PA") are compared against all enqueued stores for RAW bypassing as shown in step 802 of incoming load process 800.

At decision step 804, if (no match against any enqueued store physical address)
then at step 806 the data from the L1 cache is presumptively correct.
Alternatively, if (matched the physical address of one or more older stores)
then at step 808 return the data from the youngest matched store.

Figure 9:
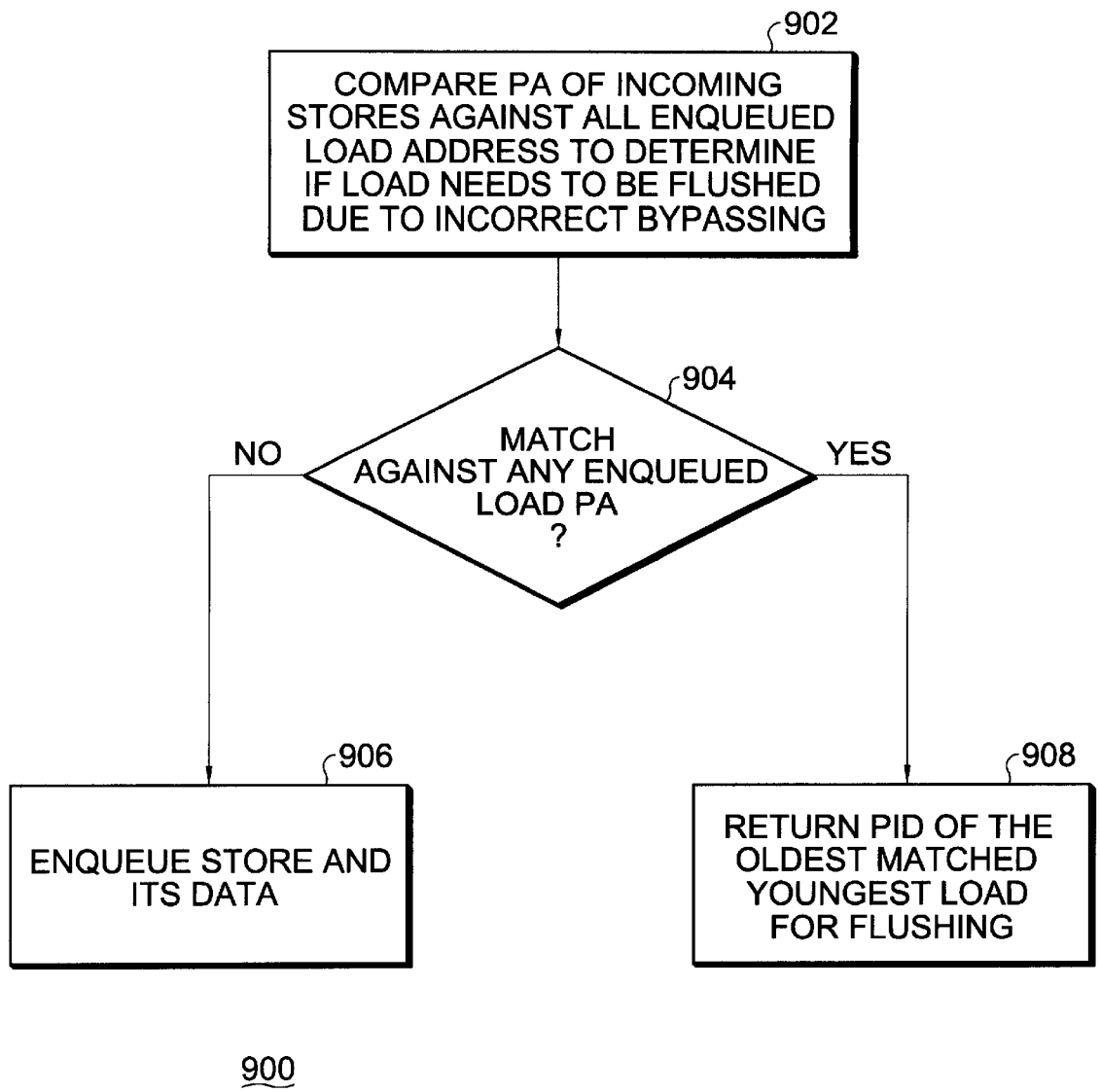
FIG. 9 is a simplified logic flow representation of the functionality of the MDB of the preceding figures upon the detection of an incoming store operation.

The MDB functionality with respect to incoming stores (ST) is shown with more particularity with respect to the incoming store process 900 of FIG. 9 and the following pseudocode:

//At step 902, the physical addresses of incoming stores are compared against all enqueued load addresses to check
//if a load needs to be flushed due to incorrect bypassing
at decision step 904, if (no match against any enqueued load physical address)
then at step 906 simply enqueue the store and its data.
alternatively, if (match against one or more younger loads)
then at step 908 return the producer identification ("PID") of the oldest matched younger load for flushing In the exemplary implementation described and illustrated, Loads and Stores can be 64-bit, 32-bit, 16-bit or 8-bit and this must be accounted for when detecting hits for bypassing. A bypassing store must contain all of the required load data. A 64-bit load cannot receive data from a shorter store.

Figure 10:
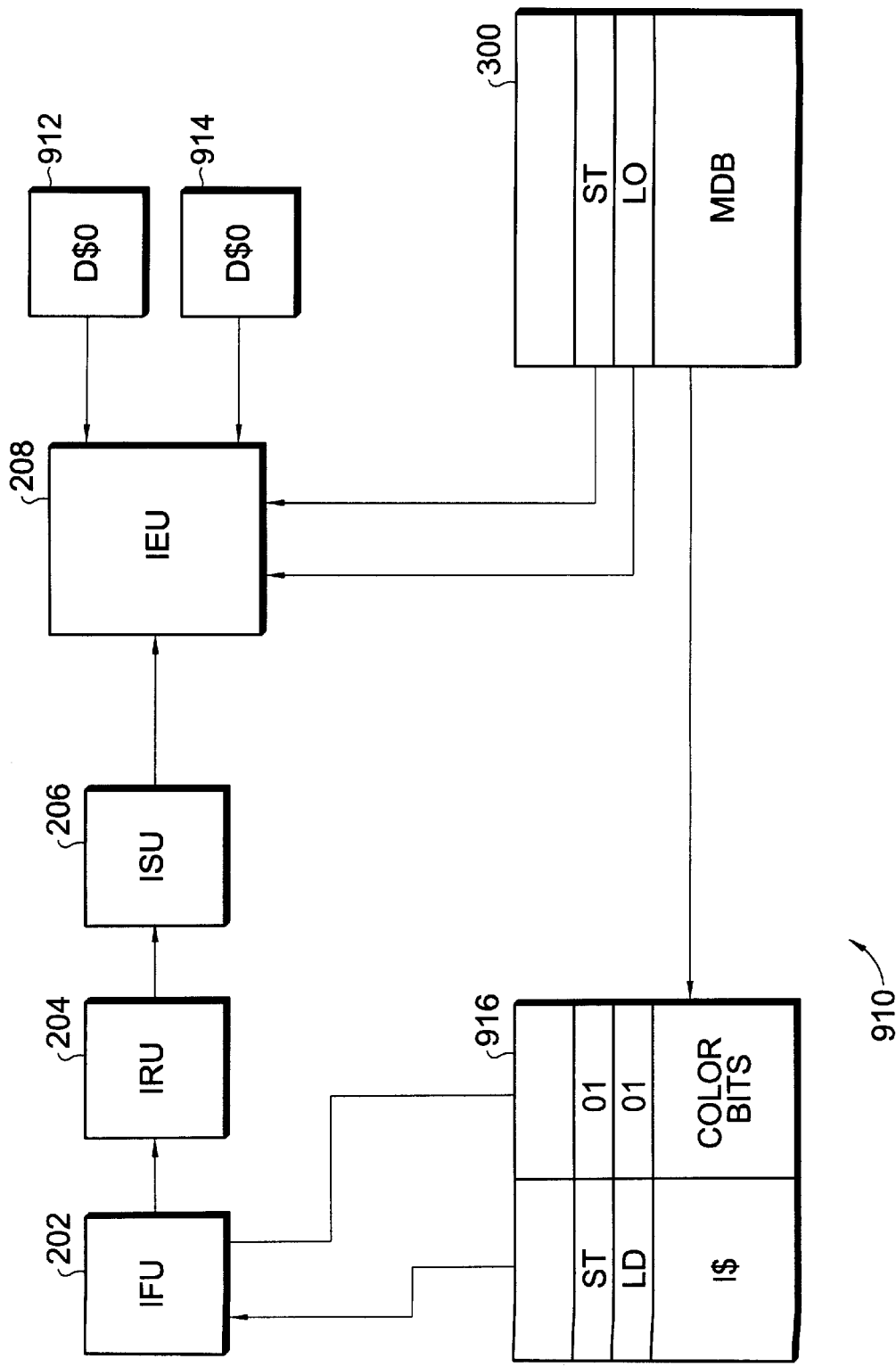
FIG. 10 is a functional block diagram of an exemplary system and apparatus for implementation of the present invention illustrating the instruction cache ("I$") in conjunction with the MDB for assigning color bits indicative of a load-store dependency such that, upon replay, such load is not boosted past a store having the same assigned "color" and wherein the ISW will schedule the load for fetching data from the MDB in lieu of the data cache ("D$0" and "D$1").

With reference additionally now to FIG. 10, an exemplary illustration of a system, apparatus and method for restraining over-eager load boosting in an out-of-order processor in accordance with the present invention is shown. The system 910 is shown in conjunction with the processor instruction fetch unit (IFU) 202, instruction renaming unit (IRU) 204 (which may include the processor dependency checking logic), instruction scheduling unit (ISU) (which may include the instruction scheduling window ("ISW"))206 and instruction execution unit (IEU) 208 as previously described with respect to FIG. 2. The IEU 208 is illustrated in conjunction with a data cache ("D$") comprising a pair of data caches 912 and 914 ("D$0" and "D$1" respectively). The MDB 300 as described in detail with respect to the preceding figures, may form a portion of the IRU 204 and is coupled to the IEU 208 as well as to an instruction cache ("I$") 916 wherein the dependency of replayed load and store instructions is indicated by associated "color" bits as will be more fully described hereinafter. The instruction cache 916 is coupled to the IFU 202 to provide the cached memory instructions and the associated color bits (if any). In an exemplary embodiment, the instruction cache 916 may form a portion of the IFU 202.

In operation and as a functional example, consider the following instructions in program order as previously described with respect to FIGS. 6 and 7:

| Add | R0, | R5 | R8 |
| ST  | R8, | R6 | R10 |
| LD  | R8, | R9 | R13 |

In this particular example, there is a dependency between the store and load instructions that would initially escape detection by the hardware dependency checking logic. However, once the dependency has been determined by the MDB 300, it would be most desirable to avoid the replay trap of again boosting the load instruction past the store (due to the execution time cost involved) given that the dependency has now been determined. Therefore, the MDB 300 is operative to ensure that when the store instruction is replayed, the dependent load does not get boosted ahead of it again.

This is effectuated by the MDB 300 informing the instruction cache 916 of the dependency by assigning a common "color" to the load and store instructions (for example each are assigned a two bit code "01") such that at the location of the store and load instructions in the instruction cache, the color "01" is associated with each. When the store and load instructions are again placed in the pipeline for execution, the dependency checking logic in the IRU 204 (which track the dependency among instructions) will detect and report the dependency. In this manner, the ISW will then be operative to not schedule the load instruction until the similar colored store has been scheduled. In this manner, even though the dependency between the example load and store instruction would have escaped detection by the dependency checking logic, once the dependency has been determined by the MDB 300, it is flagged or "colored" such that upon replay, the dependent load instruction is not boosted past the store.

In the example implementation shown, only two bits of "color" are utilized although more bits may easily be utilized to distinguish even more instruction dependencies. In operation, the first time the instructions are loaded in the instruction cache 916 the color bits are set to "00" to indicate no known dependency such that the dependency checking logic will not report a dependency. In the example shown, this leaves "01", "10" and "11" as colors available to be applied in round-robin fashion to flag subsequently noted load/store dependencies. As noted, while adding additional bits beyond the two shown may be done, such would ultimately increase the operational cost of the mechanism as a trade-off for reporting fewer false dependencies. In practice, two bits represent an acceptable compromise because any store/load instructions having previously been assigned the same color would likely have been scheduled and retired at some time prior. Moreover, since in most processor implementations approximately 30% of the scheduled instructions represent memory operations, and there are roughly two loads for each associated store, only one in every 10 instructions is ultimately a store instruction. Given the size of the ISW in the exemplary implementation shown, on average, there will only be about 12 store instructions in the ISW at any one time.

What has been disclosed, therefore, is a system, apparatus and method for restraining over-eager load boosting in an out-of-order processor through the implementation of a special "coloring" mechanism that colors dependent load and store instructions to ensure recognition of a dependency based on the assignment of a common multi-bit "color" scheme. In the exemplary embodiment disclosed herein, two bits of color are assigned to load and store instructions. These color bits are stored in a special array and are read when the load or store is read from the instruction cache ("I$"). The encoding of "00" for a load, for example, may indicate no coloring dependency for the load. Any encoding other than a "00" is utilized to indicate a store-load dependency for a store and load of the same color. The color bits for the load and store instructions are updated when a read-after-write ("RAW") hazard is detected by the memory disambiguation buffer ("MDB") for a store-load pair. The processor dependency tracking logic will enforce a dependency between a store and load of the same color (other than "00") and the instruction scheduling window ("ISW") will not boost the load past the store. Moreover, the instruction scheduling window will schedule the load for fetching data from the memory disambiguation buffer rather than the data cache ("D$").

While there have been described above the principles of the present invention in conjunction with specific processor architecture and memory operations, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A system for restraining over-eager boosting of load instructions past store instructions in an out-of-order processor, said system comprising:

a memory disambiguation buffer for storing load and store instruction addresses and associated data, said memory disambiguation buffer further indicating, with at least one bit, at least dependent one of said load instruction of said store instruction to indicate a dependency therebetween;

an instruction scheduling window in operative association with said memory disambiguation buffer, said instruction scheduling window and said memory disambiguation buffer for determining load/store dependencies responsive to values of the at least one bit but which the at least dependent one of said load and store instructions, respectively, indicated by said memory disambiguation buffer and effectuating replay of said store and load instructions wherein a dependent one of said load instructions has been executed prior to a store instruction; and an instruction cache in operative association with said memory disambiguation buffer, said instruction cache and said memory disambiguation buffer operative to thereafter associate said dependent one of said load instructions with said store instruction such that said store instruction is subsequently executed prior to said dependent one of said load instructions.

2. The system of claim 1 further comprising:

dependency checking logic coupled to receive said associated dependent one of said load instructions and said store instruction to preclude execution of said associated dependent one of said load instructions prior to execution of said store instruction.

3. The system of claim 1 wherein said dependency is indicated by setting a plurality of bits.

4. The system of claim 3 wherein a non-dependency is indicated by not setting any of said plurality of bits.

5. The system of claim 1 wherein said replay of said load instruction takes place utilizing said associated data in said memory disambiguation buffer.

6. The system of claim 1 wherein said memory disambiguation buffer comprises a content addressable memory.

7. The system of claim 1 wherein said memory disambiguation buffer comprises n entries.

8. The system of claim 7 wherein instruction scheduling window comprises 2n entries.

9. A system for ensuring that a dependent load instruction is not again executed prior to an associated store instruction in an out-of-order processor, said system comprising:

means for enqueuing addresses and data of unretired load and store instructions in a memory disambiguation buffer;

means for checking an address of an incoming load instruction against said enqueued addresses of store instructions;

means located at the memory disambiguation buffer for setting at least one indicator bit associated with said incoming load instruction an enqueued older store instruction if a match is determined between said incoming load instruction address and said enqueued older store instruction address;

means for initiating replay of said incoming load instruction and said older store instruction;

means for noting said at least one indicator bit associated with said incoming load instruction and said older store instruction are set; and means for ensuring that said older store instruction is executed prior to said incoming load instruction.

10. The system of claim 9 further comprising:

means for fetching said incoming load instruction data from said buffer for execution of said incoming load instruction.

11. The system of claim 9 wherein said means for enqueuing comprises an n entry buffer.

12. The system of claim 9 wherein said means for enqueuing comprises:

means for entering said unretired load and store instructions in said buffer in program order.

13. The system of claim 9 further comprising:

means for retiring disambiguated load and store instructions; and means for removing said addresses and data of said disambiguated load and store instructions from said buffer.

14. The system of claim 9 further comprising:

means for retiring said incoming load instruction if a match is not found between said incoming load instruction address and an enqueued older store instruction.

15. A system for ensuring that a dependent load instruction is not again executed prior to an associated store instruction in an out-of-order processor, said system comprising:

means for enqueuing addresses and data of unretired load and store instructions in a memory disambiguation buffer;

means for checking an address of an incoming store instruction against said enqueued addresses of younger load instructions;

means located at the memory disambiguation buffer for setting at least one indicator bit associated with said incoming store instruction if a match is determined between said incoming store instruction address and said enqueued younger load instruction address;

means for initiating replay of said incoming store instruction and said younger load instruction;

means for noting said at least one indicator bit associated with said incoming store instruction and said younger load instruction are set; and means for ensuring that said incoming store instruction is executed prior to said younger load instruction.

16. The system of claim 15 further comprising:

means for fetching said younger load instruction data from said buffer for execution of said younger load instruction.

17. The system of claim 15 herein said enqueuing means comprises an n entry buffer.

18. The system of claim 15 wherein said means for enqueuing comprises:

means for entering said unretired load and store instructions in said buffer in program order.

19. The system of claim 15 further comprising:

means for retiring disambiguated load and store instructions; and means for removing said addresses and data of said disambiguated load and store instructions from said buffer.

20. The system of claim 15 further comprising:

means for enqueuing said incoming store instruction if a match is not found between said incoming store instruction address and an enqueued younger load instruction address.

* * * * *

UNITED STATES PATENT AND TRADEMARK OFFICE
CERTIFICATE OF CORRECTION

PATENT NO. : 6,006,326
DATED : December 21, 1999
INVENTOR(S) : Ramesh Panwar, et. al.

It is certified that error appears in the above-identified patent and that said Letters Patent is hereby corrected as shown below:

Claims: should read as follows:

1. A system for restraining over-eager boosting of load instructions past store instructions in an out-of-order processor, said system comprising:

a memory disambiguation buffer for storing load and store instruction addresses and associated data, and for determining when a load instruction and a store instruction form a dependency therebetween;

an instruction cache in operative association with said memory disambiguation buffer, said memory disambiguation buffer operative to inform said instruction cache of the dependency between the load instruction and the store instruction, the dependency between the load instruction and the store instruction indicated by assigning a common bit code value to the load and store instructions, respectively, dependent upon one another; and an instruction scheduling window in operative association with said instruction cache and with said memory disambiguation buffer, said instruction scheduling window for scheduling execution of the load instruction and the store instruction such that the bad instruction is scheduled for execution only subsequent to scheduling for execution of the store instruction.

UNITED STATES PATENT AND TRADEMARK OFFICE
CERTIFICATE OF CORRECTION

PATENT NO. : 6,006,326
DATED : December 21, 1999
INVENTOR(S) : Ramesh Panwar, et. al.

It is certified that error appears in the above-identified patent and that said Letters Patent is hereby corrected as shown below:

10. A system for ensuring that a dependent load instruction is not again executed prior to an associated store instruction in an out-of-order processor, said system comprising:

means for enqueuing addresses and data of unretired load and store instructions in a memory disambiguation buffer;

means for checking an address of an incoming load instruction against said enqueued addresses of store instructions and for determining whether a match is made between said incoming load instruction and enqueued addresses of store instructions;

means located at the memory disambiguation buffer for setting at least one indicator bit associated with said incoming load instruction an enqueued older store instruction if a match is determined between said incoming load instruction address and said enqueued older store instruction address;

means located at an instruction scheduling window for initiating replay of said incoming load instruction and said older store instruction;

means for noting said at least one indicator bit associated with said incoming load instruction and said older store instruction are set; and means for ensuring that said older store instruction is executed prior to said incoming load instruction.

UNITED STATES PATENT AND TRADEMARK OFFICE
CERTIFICATE OF CORRECTION

PATENT NO. : 6,006,326
DATED : December 21, 1999
INVENTOR(S) : Ramesh Panwar, et. al.

It is certified that error appears in the above-identified patent and that said Letters Patent is hereby corrected as shown below:

16. A system for ensuring that a dependent load instruction is not again executed prior to an associated store instruction in an out-of-order processor, said system comprising:

means for enqueuing addresses and data of unretired load and store instructions in a memory disambiguation buffer;

means for checking an address of an incoming store instruction against said enqueued addresses of younger load instructions and for determining whether a match is made between said incoming store instruction and enqueued addresses of younger load instructions;

means located at the memory disambiguation buffer for setting at least one indicator bit associated with said incoming store instruction if a match is determined between said incoming store instruction address and said enqueued younger load instruction address;

means located at an instruction storage window for initiating replay of said incoming store instruction and said younger load instruction;

means for noting said at least one indicator bit associated with said incoming store instruction and said younger load instruction are set; and means for ensuring that said incoming store instruction is executed prior to said younger load instruction.

Signed and Sealed this

Fourteenth Day of November, 2000

*Attest:*

Q. TODD DICKINSON

*Attesting Officer*   *Director of Patents and Trademarks*